United States Patent Office
2,755,093
Patented July 17, 1956

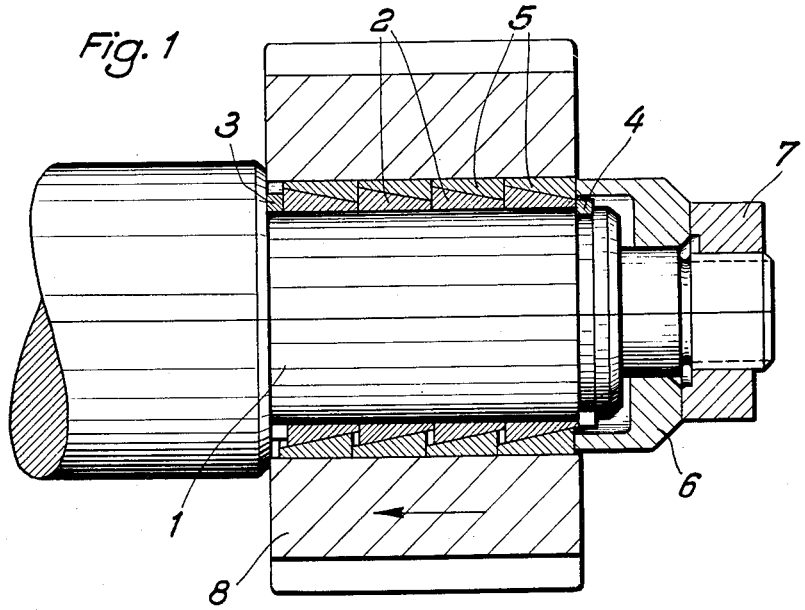
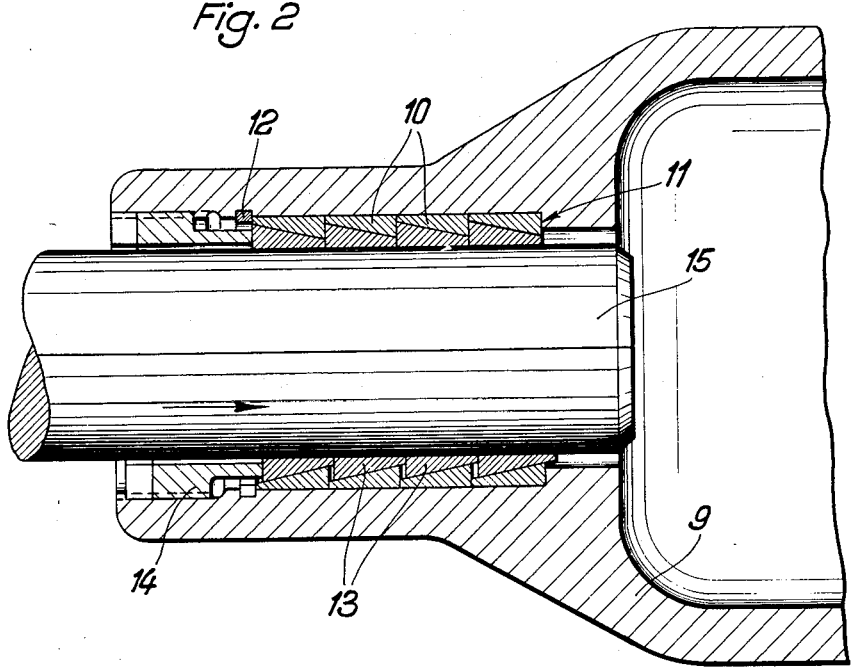
Inventors:
Oskar E. Peter
& Ernst Kreissig

2,755,093

CLAMPING MEANS

Oskar E. Peter and Ernst Kreissig, Krefeld-Uerdigen, Germany

Application December 29, 1953, Serial No. 400,973

Claims priority, application Germany January 2, 1953

3 Claims. (Cl. 279—2)

This invention relates to improved means for clamping rotary members together, and more particularly to an improvement in such ring spring clamping means as are disclosed in Peter Patent No. 2,573,928.

The above-mentioned patent discloses the use of ring springs which are solid in a continuous unbroken circle and have inter-engaging conical surfaces which provide a radial wedging action when the set of ring springs is axially compressed, with the result that the outer rings elastically expand and the inner rings elastically contract. When a set of such ring springs are inserted in an annular space between two rotary members, the expansion of the outer ring against the outer member and the contraction of the inner rings against the inner member connects the two members strongly and solidly for transmission of rotary power therebetween.

The present invention represents a further development of the use of such ring springs for such clamping purposes. Whereas heretofore the rings have been so arranged that the axial compression axially displaces both the outer and the inner set of rings, according to the present invention the outer rings are in solidly abutting, side-by-side relation with each other, directly or through an intermediate sleeve or the like, to prevent them from being axially displaced, and the inner rings are in corresponding abutting relation so that they all move together axially in response to an axial force applied at one end of the inner rings. Conversely, of course, the inner rings may be held against axial displacement, while the outer rings are moved axially to effect the wedging and consequent clamping action. Among the advantages of this arrangement is the fact that the abutting relationship between the outer rings, on one hand, and between the inner rings, on the other hand, tends to prevent dirt from working into the inter-engaging conical surfaces of the rings. A more positive compressive, wedging and clamping action is achieved, since all of the axially displaced rings move together, and a more uniform tightening and clamping pressure over the whole series of rings is obtained. During the tightening operation there are only two friction surfaces where sliding action takes place in the case of each pair of rings having inter-engaging conical surfaces.

Further objects, advantages, and features of the invention will become apparent as the following detailed description of present preferred embodiments of the invention proceeds. In the accompanying drawing:

Figure 1 shows a section through the axis of a shaft connected to a gear through clamping means embodying the invention, the upper half of the figure showing the clamping means in untightened position, and the lower half of the drawing showing the clamping means in tightened position; and Figure 2 shows a section through the axis of a shaft connected to a hub by a modified form of clamping means embodying the invention, with the upper half of the figure showing the clamping means in untightened position and the lower half of the figure showing the clamping means in tightened position.

Referring now more particularly to the drawing and initially to Figure 1, there is shown a shaft 1 having a cylindrical surface around which are mounted a series of solid rings springs 2 held at their opposite ends against axial movement on the shaft 1 by stop rings 3 and 4. Each of the inner rings 2 is surrounded by a corresponding outer solid ring spring 5. Each pair of corresponding rings 2 and 5 have inter-engaging conical surfaces to effect radial wedging action between them when the rings 5 are moved to the left, as shown in Figure 1, relative to the rings 2. The stop rings 3 and 4 and the rings 2 therebetween extend side-by-side in solidly abutting relation and are axially immovable on shaft 1 at all times. The outer rings 5 also extend side-by-side in solidly abutting relation, and at one end of the series of outer rings 5 axial pressure is selectively applied and released by means of a tightening member 6 controlled by an abutting tightening screw 7 threaded on the shaft 1. As shown in the lower half of Figure 1, when the tightening member 6 is moved axially against the nearest ring 5, all of the rings 5 are moved together to the left as shown in Figure 1, which causes the rings 5 to ride up on the conical surfaces of the ring 2 and thus expands the rings 5 into clamping engagement with the surrounding bore of a gear member 8 which is thereby clamped to the shaft 1 for transmission of rotary power therebetween. During this tightening action the rings 2 are held against axial displacement by the stop members 3 and 4, and if not already firmly engaged with the shaft 1 become so under the wedging pressure of the outer rings 5. When the nut 7 and tightening member 6 are backed off to free the outer rings 5 from axial compression, the resilient force of the outer rings 5 causes them to slide along the rings 2 and resume their unexpanded position as shown at the top of Figure 1.

In the embodiment illustrated in Figure 2 a hub housing 9 has a bore receiving a series of outer solid ring springs 10 which are in side-by-side, solidly abutting relation with each other along their side edges, and which are held against axial movement against hub 9 by a flange 11 of hub 9 abutting the outer end of one endmost ring 10 and by a stop ring 12 fixed in a groove in hub 9 and abutting the outer end of the other endmost ring 10. Each of the outer rings 10 surround corresponding inner solid ring springs 13, and each pair of corresponding inner and outer rings 10 and 13 have interengaging conical surfaces for effecting radial wedging action between them. The inner rings 13 are in side-by-side solidly abutting relation with each other along their side edges, and are movable axially relative to rings 10 by a tightening member 14 threaded into the hub 9. When the rings 13 are relaxed, as shown in upper half of Figure 2, they receive a shaft 15, and when the tightening member 14 is tightened against the nearest ring 13 all of the rings 13 move together to the right as shown in Figure 2 and ride up on the conical surfaces of the rings 10, which contracts the rings 13 and thereby clamps them solidly against the shaft 15, while also pressing the rings 10 more tightly against the hub 9, so that rotary power may be transmitted between the shaft 15 and hub 9. The outer rings 10 are axially immovable during this tightening action. When the tightening member 14 is backed away from the rings 13 the latter rings strongly tend to return elastically to their former shape, which causes them to slide back along the rings 10 and shaft 15 until they resume the position shown in the upper half of Figure 2.

It will be observed that the improvement of the invention causes only the outer rings, or only the inner rings, as the case may be, to move axially, and hence the axially moving rings are displaced more uniformly axially and achieve a more uniform radial clamping action. Since only two friction surfaces have any sliding action in the case of each pair of interengaging inner and outer rings, the effectiveness of the tightening connection is improved, and when the tightening is relieved the clamping rings return to their original position more easily. The abutting relationship between the outer rings with each other, and of the inner rings with each other, helps to protect the parts against infiltration of dirt and consequent injury to finely machined surfaces. The fact that only the inner rings, or only the outer rings, as the case may be, take part in the necessary movement for clamping action improves the accuracy of the clamping system, with particular reference to holding the rotary members in correct concentric relationship. Once the rings are in full clamping position the unit as a whole is solid and provides a gas and fluid-tight union.

While we have illustrated and described present preferred embodiments of the invention and methods of practicing the same, it will be recognized that the invention is not limited thereto but may be otherwise embodied and practiced within the scope of the following claims.

We claim:

1. In combination, two rotary members having an annular space therebetween, and clamping means in said space releasably connecting said members for transmission of rotary power therebetween, said clamping means comprising a set of outer rings and a set of inner rings, with adjacent inner and outer rings having interengaging conical surfaces for effecting radial wedging action therebetween when one of said sets of rings is moved axially relative to the other, each set of rings having its rings in solidly side-by-side abutting relation, each ring of both sets of rings being resilient and extending in a continuous unbroken circle, means restraining the rings of one of said sets of rings against axial movement, and means for moving all of the other set of rings equally and simultaneously in an axial direction to wedge the two sets of rings together on their interengaging conical surfaces, thereby clamping the two rotary members together.

2. In combination, two members having an annular space therebetween, and clamping means in said space releasably connecting said members, said clamping means comprising a set of outer rings and a corresponding set of inner rings with adjacent pairs of inner and outer rings having interengaging surfaces for effecting radial wedging action therebetween when one of said sets of rings is moved axially relative to the other, the rings in each set of rings being of the same diameter as the other rings of the same set and in solidly side-by-side abutting relation while in clamping and also in release positions, the inner ring and outer ring of each pair of interengaging rings having the same axial width, means restraining the rings of one of said sets of rings against axial movement, and means for moving all of the other set of rings equally and simultaneously in an axial direction to wedge the two sets of rings together on their interengaging conical surfaces, thereby clamping the two members together.

3. In combination, two rotary members having an annular space therebetween, and clamping means in said space releasably connecting said members for transmission of rotary power therebetween, said clamping means comprising a set of outer rings and a set of inner rings, with adjacent inner and outer rings having interengaging conical surfaces for effecting radial wedging action therebetween when one of said sets of rings is moved axially relative to the other, each set of rings having its rings in solidly side-by-side abutting relation, each ring of both sets of rings being resilient and extending in a continuous unbroken circle, and the inner ring and outer ring of each pair of interengaging rings having the same axial width, means restraining the rings of one of said sets of rings against axial movement, and means for moving all of the other set of rings equally and simultaneously in an axial direction to wedge the two sets of rings together on their interengaging conical surfaces, thereby clamping the two rotary members together.

References Cited in the file of this patent

UNITED STATES PATENTS

| | | |
|---|---|---|
| 1,056,480 | Wood | Mar. 18, 1913 |
| 1,316,709 | Gray | Sept. 23, 1919 |
| 1,851,729 | Raybould | Mar. 29, 1932 |
| 2,269,756 | Cowie | Jan. 13, 1942 |
| 2,470,924 | Flogous | May 24, 1949 |
| 2,670,797 | Armentrout | Mar. 2, 1954 |

FOREIGN PATENTS

| | | |
|---|---|---|
| 492,959 | Great Britain | Sept. 29, 1938 |